United States Patent
Jang

(10) Patent No.: US 11,616,224 B2
(45) Date of Patent: Mar. 28, 2023

(54) PROCESS FOR PRODUCING SEMICONDUCTOR NANOWIRES AND NANOWIRE-GRAPHENE HYBRID PARTICULATES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 213 days.

(21) Appl. No.: 16/250,559

(22) Filed: Jan. 17, 2019

(65) Prior Publication Data

US 2020/0235380 A1    Jul. 23, 2020

(51) Int. Cl.
*H01M 4/1393*    (2010.01)
*H01M 4/04*    (2006.01)
(Continued)

(52) U.S. Cl.
CPC ......... *H01M 4/1393* (2013.01); *C01B 32/184* (2017.08); *C01B 32/194* (2017.08);
(Continued)

(58) Field of Classification Search
CPC ............ H01M 4/1393; H01M 4/0419; H01M 4/0426; H01M 4/0428; H01M 4/045; H01M 4/0471; H01M 4/133; H01M 4/134; H01M 4/1395; H01M 4/386; H01M 4/587; H01M 10/0525; H01M 4/366; H01M 4/625;
(Continued)

(56) References Cited

U.S. PATENT DOCUMENTS 7,615,206 B2    11/2009    Sandhage et al.
9,774,033 B2    9/2017    Fang et al.
(Continued)

FOREIGN PATENT DOCUMENTS

KR    1020100007255 U    7/2010
KR    1020120031119 A    3/2012

OTHER PUBLICATIONS

PCT/US20/13977 International Search Report and Written Opinion dated May 12, 2020, 11 pages.
(Continued)

*Primary Examiner* — Andrew J. Oyer

(57) ABSTRACT

Disclosed is a process for producing graphene-semiconductor nanowire hybrid material, comprising: (A) preparing a catalyst metal-coated mixture mass, which includes mixing graphene sheets with micron or sub-micron scaled semiconductor particles to form a mixture and depositing a nano-scaled catalytic metal onto surfaces of the graphene sheets and/or semiconductor particles; and (B) exposing the catalyst metal-coated mixture mass to a high temperature environment (preferably from 100° C. to 2,500° C.) for a period of time sufficient to enable a catalytic metal-catalyzed growth of multiple semiconductor nanowires using the semiconductor particles as a feed material to form the graphene-semiconductor nanowire hybrid material composition. An optional etching or separating procedure may be conducted to remove catalytic metal or graphene from the semiconductor nanowires.

23 Claims, 11 Drawing Sheets

(51) Int. Cl.
  *H01M 4/133* (2010.01)
  *H01M 4/134* (2010.01)
  *H01M 4/1395* (2010.01)
  *H01M 4/38* (2006.01)
  *H01M 4/587* (2010.01)
  *H01M 10/0525* (2010.01)
  *C01B 32/184* (2017.01)
  *C01B 33/021* (2006.01)
  *H01M 4/36* (2006.01)
  *C01B 32/194* (2017.01)

(52) U.S. Cl.
  CPC ........... *C01B 33/021* (2013.01); *H01M 4/045* (2013.01); *H01M 4/0419* (2013.01); *H01M 4/0426* (2013.01); *H01M 4/0428* (2013.01); *H01M 4/0471* (2013.01); *H01M 4/133* (2013.01); *H01M 4/134* (2013.01); *H01M 4/1395* (2013.01); *H01M 4/366* (2013.01); *H01M 4/386* (2013.01); *H01M 4/587* (2013.01); *H01M 10/0525* (2013.01); *C01P 2004/16* (2013.01); *C01P 2004/64* (2013.01)

(58) Field of Classification Search
  CPC ...... H01M 4/38; C01B 32/194; C01B 32/184; C01B 33/021; C01P 2004/64; C01P 2004/16; Y02E 60/10
  See application file for complete search history.

(56) References Cited

U.S. PATENT DOCUMENTS

| | | |
|---|---|---|
| 2009/0267921 A1 | 10/2009 | Pryor |
| 2011/0309306 A1 | 12/2011 | Zhou et al. |
| 2012/0070964 A1* | 3/2012 | Perraud ............ H01L 21/02664 438/478 |
| 2017/0149054 A1* | 5/2017 | Fang .................. H01M 4/0428 |

OTHER PUBLICATIONS

PCT/US20/13978 International Search Report and Written Opinion dated May 12, 2020, 12 pages.

* cited by examiner

2 μm

2 μm

PROCESS FOR PRODUCING SEMICONDUCTOR NANOWIRES AND NANOWIRE-GRAPHENE HYBRID PARTICULATES

FIELD OF THE INVENTION

This invention relates to a process for producing semiconductor nanowires for lithium-ion battery anode applications.

BACKGROUND

Lithium ion battery is a prime candidate energy storage device for electric vehicle (EV), renewable energy storage, and smart grid applications. Graphite materials have been widely used as an anode active material for commercial lithium ion batteries due to their relatively low cost and excellent reversibility. However, the theoretical lithium storage capacity of graphite is only 372 mAh/g (based on $LiC_6$), which can limit the total capacity and energy density of a battery cell. The emerging EV and renewable energy industries demand the availability of rechargeable batteries with a significantly higher energy density and power density than what the current Li ion battery technology can provide. Hence, this requirement has triggered considerable research efforts on the development of electrode materials with higher specific capacity, excellent rate capability, and good cycle stability for lithium ion batteries.

Several elements from Group III, IV, and V in the periodic table can form alloys with Li at certain desired voltages. Therefore, various anode materials based on such elements (e.g. Si, Ge, Sn, Sb, etc.), their compounds, and some metal oxides (e.g., $SnO_2$) have been proposed for lithium ion batteries. Among these, silicon is considered the most promising one since it has the highest theoretical specific capacity (up to 4,200 mAh/g in the stoichiometric form of $Li_{4.4}Si$) and low discharge potential (i.e., high operation potential when paired with a cathode).

However, using Si as an example, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsically low electric conductivity of silicon and other semiconductor materials is another challenge that needs to be addressed. Thus far, many attempts have been made to improve the electrochemical performance of Si-based anode materials, which include (1) reducing particle size to the nano-scale (<100 nm), such as Si nanoparticles, nanowires, or thin film, to reduce the total strain energy, which is a driving force for crack formation in the particle; (2) depositing Si particles on a highly electron-conducting substrate; (3) dispersing Si particles in an active or non-active matrix; and (4) coating Si particles with a layer of carbon. Although some promising anodes with specific capacities in excess of 1,000 mAh/g (at a low charge/discharge rate; e.g. 0.1 C) have been reported, it remains challenging to retain such high capacities over cycling (e.g., for more than 100 cycles) without significant capacity fading. Furthermore, at a higher C rate, Si particles and other high-capacity anode active material (Ge, Sn, etc.) are typically incapable of maintaining a high lithium storage capacity. It may be noted that a rate of n C means completing the charge or discharge cycle in 1/n hours: 0.1 C=10 hours, 0.5 C=2 hours, 3 C=⅓ hours or 20 minutes.

Although nano-scaled anode active materials, such as Ge nanoparticles, Si nanowires, and Sn nanofilms, are promising high-capacity anode materials, these materials remain too expensive to be economically viable. Again, using Si as an example, common methods used for producing silicon nanopowders include plasma-enhanced chemical vapor deposition (PECVD), laser-induced pyrolysis of $SiH_4$, and hot-wire synthesis methods. From mass production and cost perspectives, current processes for producing nano Si powder have been time-consuming and energy-intensive, also typically requiring the use of high-vacuum, high-temperature, and/or high-pressure production equipment. The resulting Si nanopowder products have been extremely expensive and this cost issue has severely impeded the full-scale commercialization of Si nanopowder materials. Hence, there exists a strong need for a more cost-effective process for producing Si nanopowder (e.g. Si nanowires or nanoparticles) in large quantities.

For instance, U.S. Pat. No. 7,615,206 issued on Nov. 10, 2009 to K. H. Sandhage and Z. H. Bao provides methods for the production of shaped nanoscale-to-microscale silicon through partially or completely converting a nanoscale-to-microscale silica template by using magnesium vapor. Magnesiothermic reduction of silica requires much lower temperatures (normally in the range of 600-800° C.) compared with the carbothermal reduction of silica (normally over 2000° C.) and thus has become a relatively popular technique used in pure metal production. Silicon is obtained by the following reaction: $2Mg+SiO_2 \rightarrow 2MgO+Si$. However, this process must be conducted under a high pressure condition and there is the danger of explosion not just during the reaction procedure (due to pressure vessel weakness), but also after the reaction is presumably completed when the reactor is opened (ultra-fast reaction of un-used Mg with air). Furthermore, when using Mg vapor to chemically reduce silica, magnesium silicide could be easily formed and, hence, this process is not suitable for mass production. Using magnesium powder will add to cost of producing nano-sized silicon and the particle size of magnesium could dramatically influence the reduction results and purity.

Herein, we present a facile and cost-effective method of mass-producing semiconductor nanowires. This method avoids all the problems commonly associated with conventional methods of producing nano-scaled semiconductor materials.

SUMMARY OF THE INVENTION

The present invention provides a process for producing a graphene/semiconductor nanowire hybrid material composition; the process comprising: (A) preparing a catalyst metal-coated mixture mass, which includes mixing exfoliated graphite flakes, having a flake thickness from 100 nm to 1 µm, or graphene sheets, having a thickness from 0.34 nm to 100 nm, with micron or sub-micron scaled semiconductor particles, having a particle diameter from 50 nm to 50 µm, to form a mixture and depositing a catalytic metal, in the form of nanoparticles having a size from 1 nm to 100 nm or a coating having a thickness from 1 nm to 100 nm, onto surfaces of said exfoliated graphite flakes or graphene sheets and/or surfaces of the semiconductor particles, wherein the semiconductor material is selected from Ga, In, Ge, Sn, Pb, P, As, Sb, Bi, Te, a combination thereof, a compound thereof, or a combination thereof with Si having less than 30% by weight of Si; and (B) exposing the catalyst metal-coated mixture mass to a high temperature environment, from 100° C. to 2,500° C., for a period of time sufficient to enable a catalytic metal-assisted growth of multiple semiconductor nanowires, having a diameter or thickness from 2 nm to 100 nm, from the semiconductor particles to form the graphene-semiconductor nanowire hybrid material composition. The hybrid material can contain from 1% to 99% by weight of the semiconductor nanowires. It is particularly desirable to have a hybrid material having graphene sheets and ultra-thin semiconductor nanowires, having a diameter from 2 nm to 20 nm, preferably from 2 nm to 15 nm, and most preferably from 2 nm to 10 nm.

The compounds of these semiconductor materials include the III-VI compounds (e.g. InP, GaAs, GaP, etc.) and oxides, borides, carbides, nitrides of these elements, such as GaN, Their combinations with Si include alloys or compounds, such as $Ge_xSi_{1-x}$, where $0.5<x<1$ but the Si weight proportion is less than 30% by weight.

The graphene material (graphene sheets) may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof. Preferably, the graphene material is selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

In certain embodiments, the catalytic metal is selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof, wherein said catalytic metal is different than the semiconductor material. Preferably, a catalytic metal and its pairing semiconductor material form a eutectic point in the phase diagram.

The starting micron or sub-micron scaled semiconductor particles can have a diameter from 0.2 µm to 50 µm, but preferably from 0.5 µm to 5 µm, and more preferably <3 µm.

The starting semiconductor particles and starting graphene material (in a thin sheet form), referred to as primary particles, are mixed to produce secondary particles, which are each a mixture of graphene sheets, semiconductor particles, and possibly other ingredients (e.g. conductive additive). In an embodiment, the graphene sheets and micron or sub-micron scaled semiconductor particles are mixed to form a mixture in a particulate form of multiple secondary particles having a size from 1 µm to 30 µm.

In one embodiment, the starting graphene sheets and micron or sub-micron scaled semiconductor particles are mixed to form a mixture prior to the step of depositing a catalytic metal on surfaces of graphene sheets and/or surfaces of semiconductor particles. This mixture is preferably prepared in a particulate form, characterized by having the two primary particles (graphene sheets or exfoliated graphite flakes and semiconductor particles) combined to form secondary particles having a diameter from 1 to 100 µm, preferably from 2 to 50 µm, and more preferably from 5 to 20 µm. The graphene/semiconductor mixture can optionally contain an amount (e.g. 1% to 30% by weight) of conductive additive for the mere purpose of enhancing the electrical or thermal conductivity of the resulting electrode. The conductive additive may be selected from natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof. This conductive additive is preferably not coated with a catalytic metal and is not involved in promoting the growth of semiconductor nanowires.

In certain embodiments, at least one of the secondary particles (also referred to as particulates) comprises multiple semiconductor nanowires that are embraced or encapsulated by a shell of graphene sheets or exfoliated graphite flakes.

The step of mixing the semiconductor particles and graphene sheets is conducted by liquid solution mixing, homogenizer mixing, high shearing mixing, wet milling, air milling, or ball-milling.

In an alternative embodiment, the mixing of graphene sheets (or exfoliated graphite flakes) with micron or sub-micron scaled semiconductor particles is conducted after surfaces of the graphene sheets and/or the semiconductor particles are deposited with the catalytic metal. The mixing of graphene sheets with micron or sub-micron scaled semiconductor particles is conducted in such a manner that the resulting mixture is in a form of porous secondary particles having a diameter from 1 µm to 20 µm and having mesopores therein from 2 nm to 100 nm in size.

In certain embodiments, in the invented process, the step of depositing a catalytic metal includes (a) dissolving or dispersing a catalytic metal precursor in a liquid to form a precursor solution, (b) bringing the precursor solution in contact with surfaces of the graphene sheets, exfoliated graphite flakes, and/or semiconductor particles, (c) removing the liquid component; and (d) chemically or thermally converting the catalytic metal precursor to the catalytic metal coating or metal nanoparticles. In one embodiment, the step (d) of chemically or thermally converting the catalytic metal precursor is conducted concurrently with the procedure (B) of exposing the catalyst metal-coated mixture mass to a high temperature environment.

In the process, the step (d) of chemically or thermally converting the catalytic metal precursor may be conducted concurrently with the procedure (C) of exposing the catalyst metal-coated mixture mass to a high temperature environment.

In certain embodiments, the catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof.

In some preferred embodiments, the catalytic metal precursor is selected from a nitrate, acetate, sulfate, phosphate, hydroxide, or carboxylate of a metal selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof.

In some embodiments, the catalytic metal precursor is selected from a nitrate, acetate, sulfate, phosphate, hydroxide, or carboxylate of a transition metal.

The step (C) of exposing the catalyst metal-coated semiconductor material to a high temperature environment is preferably conducted in steps, including at least at a lower temperature (first temperature) for a first period of time and then at a higher temperature (second temperature) for a second period of time. These temperatures can include a first temperature from 100° C. to 1,000° C. and a second temperature from 600° C. to 2,500° C. The heat treatment at the first temperature is mainly aimed at reducing the metal precursor (e.g. a metal salt) to a metal phase or to activate the metal coated on semiconductor material. The heat treatment at the second temperature is aimed at building a thermodynamic environment conducive to initiation and growth of semiconductor nanowires from the semiconductor particles. It may be noted that the required high temperature range depends on the catalytic metal used.

In certain embodiments, the semiconductor material and the pairing catalytic metal form an eutectic point in the phase diagram and the procedure of exposing the catalyst metal-coated semiconductor material to a high temperature environment includes exposing the material to a temperature equal to or higher than the eutectic point for a desired period of time and then bringing the material to a temperature below the eutectic point. In some embodiments, the exposure temperature is higher than the eutectic temperature by 0.5 to 500 degrees in Celsius scale (preferably by 1-100 degrees centigrade).

These semiconductor nanowires appear to have extruded out from the starting semiconductor particles and emanate from a center of the semiconductor particle. The semiconductor nanowires produced in this manner typically have a diameter less than 100 nm and a length-to-diameter aspect ratio of at least 5 (more typically l/d=10-10,000 and most typically 100-1,000).

In an embodiment, the step of depositing a catalytic metal on surfaces of the semiconductor particles and graphene sheets or expanded graphite flakes includes (a) dissolving or dispersing a catalytic metal precursor in a liquid to form a precursor solution, (b) bringing said precursor solution in contact with surfaces of semiconductor particles and graphene sheets or expanded graphite flakes, (c) removing the liquid; and (d) chemically or thermally converting said catalytic metal precursor to said catalytic metal coating or nanoparticles. The step (d) of chemically or thermally converting the catalytic metal precursor is conducted concurrently with the procedure (C) of exposing the catalyst metal-coated materials to a high temperature environment.

Preferably, the catalytic metal precursor is a salt or organo-metal molecule of catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof. Examples of the precursors include copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

The catalytic metal is preferably selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof. They can be produced from the aforementioned precursors. Alternatively, the deposition of catalytic metal can be accomplished more directly. Thus, in an embodiment, the step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof.

The procedure of exposing the catalyst metal-coated materials to a high temperature environment may be conducted in a protective atmosphere of an inert gas, nitrogen gas, hydrogen gas, a mixture thereof, or in a vacuum.

The presently invented process may further comprise a procedure of removing the catalytic metal from the graphene/semiconductor nanowires hybrid after the nanowires are produced; for instance, via chemical etching or electrochemical etching.

The process may further comprise a procedure of mixing semiconductor nanowires with a carbonaceous or graphitic material (as a conductive additive) and an optional binder material to form an electrode layer, wherein the carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

The present invention also provides a process for producing a graphene/semiconductor nanowire hybrid material composition wherein the semiconductor nanowires have a diameter or thickness from 2 nm to 100 nm, the process comprising: (a) preparing a precursor mixture of semiconductor particles (having a size from 50 nm to 100 μm) and graphene sheets or expanded graphite flakes, wherein the semiconductor is selected from Ga, In, Ge, Sn, Pb, P, As, Sb, Bi, Te, a combination thereof, a compound thereof, or a combination thereof with Si; (b) depositing a catalyst metal precursor onto surfaces of the semiconductor particles and graphene sheets or expanded graphite flakes to form a catalyst metal precursor-coated material mixture; and (c) exposing the catalyst metal precursor-coated material mixture to a high temperature environment, from 100° C. to 2,500° C., for a period of time sufficient to convert the catalyst metal precursor to a metal catalyst in the form of nanoparticles having a size from 1 nm to 100 nm or a coating having a thickness from 1 nm to 100 nm in physical contact with the semiconductor particles and graphene sheets or expanded graphite flakes, and enable a catalyst metal-assisted growth of multiple semiconductor nanowires from the semiconductor particles. It is essential that the catalyst metal nanoparticles coating are in physical contact with the semiconductor particles and graphene sheets or expanded graphite flakes, preferably deposited on surfaces of the semiconductor particles and graphene sheets or expanded graphite flakes.

In certain preferred embodiments, the semiconductor material and the catalyst metal form an eutectic point step (c) of exposing the catalyst metal precursor-coated semiconductor material to a high temperature environment includes exposing the material to an exposure temperature equal to or higher than the eutectic point for a desired period of time and then bringing the material to a temperature below this exposure temperature for a desired period of time or at a desired temperature decreasing rate.

The invention also provides a graphene-semiconductor nanowire hybrid material composition, comprising from 1% to 99% by weight of graphene sheets and semiconductor nanowires having a diameter from 2 nm to 20 nm (preferably from 2 nm to 15 nm), wherein the semiconductor material is selected from Ga, In, Ge, Sn, Pb, P, As, Sb, Bi, Te, a combination thereof, a compound thereof, or a combination thereof with Si having less than 30% by weight of Si.

The present invention also provides a battery electrode containing semiconductor nanowires (with or without the graphene sheets or expanded graphite flakes) that are produced by the inventive process. Also provided is a lithium battery containing semiconductor nanowires produced by the inventive process as an anode active material.

DETAILED DESCRIPTION OF PREFERRED EMBODIMENTS

The present invention provides a process for producing a graphene/semiconductor nanowire hybrid material composition; the process comprising: (A) preparing a catalyst metal-coated mixture mass, which includes mixing exfoliated graphite flakes, having a flake thickness from 100 nm to 1 µm, or graphene sheets, having a thickness from 0.34 nm to 100 nm, with micron or sub-micron scaled semiconductor particles, having a particle diameter from 50 nm to 50 µm, to form a mixture and depositing a catalytic metal, in the form of nanoparticles having a size from 1 nm to 100 nm or a coating having a thickness from 1 nm to 100 nm, onto surfaces of said exfoliated graphite flakes or graphene sheets and/or surfaces of the semiconductor particles, wherein the semiconductor material is selected from Ga, In, Ge, Sn, Pb, P, As, Sb, Bi, Te, a combination thereof, a compound thereof, or a combination thereof with Si having less than 30% by weight of Si; and (B) exposing the catalyst metal-coated mixture mass to a high temperature environment, from 100° C. to 2,500° C., for a period of time sufficient to enable a catalytic metal-assisted growth of multiple semiconductor nanowires, having a diameter or thickness from 2 nm to 100 nm, from the semiconductor particles to form the graphene-semiconductor nanowire hybrid material composition. The compounds of these semiconductor materials include the III-VI compounds (e.g. InP, GaAs, GaP, etc.) and oxides, borides, carbides, nitrides of these elements, such as GaN, Their combinations with Si include alloys or compounds, such as $Ge_xSi_{1-x}$, where $0.5<x<1$ but the Si weight proportion is less than 30% by weight.

The present invention provides a process for initiating and growing semiconductor nanowires from micron or sub-micron scaled semiconductor particles having an original particle diameter (prior to nanowire growth) from 50 nm to 500 µm (preferably from 100 nm to 20 µm). In other words, the starting material is micron or sub-micron scaled semiconductor particles, which are thermally and catalytically converted directly into nano-scaled, wire-shaped structures having a diameter or thickness from 2 nm to 100 nm. Graphene sheets and/or expanded graphite flakes play a key role in promoting the growth of a larger number of smaller-diameter semiconductor nanowires (more typically from 2 to 35 nm) relative to the growth of semiconductor nanowires (typically having a diameter from 10 nm to 100 nm and more typically from 35 to 90 nm) from semiconductor particles alone without the presence of graphene sheets and/or expanded graphite flakes.

Figure 4A:
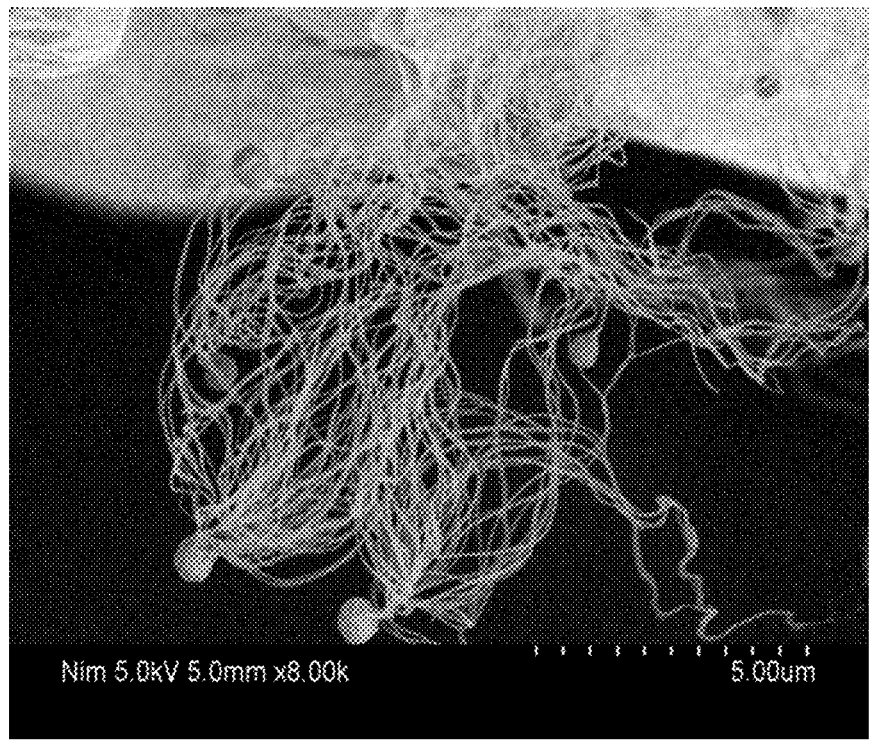
FIG. 4(A) SEM image of Si nanowires grown from Si particles without the presence of graphene sheets or graphite flakes.
Figure 4B:
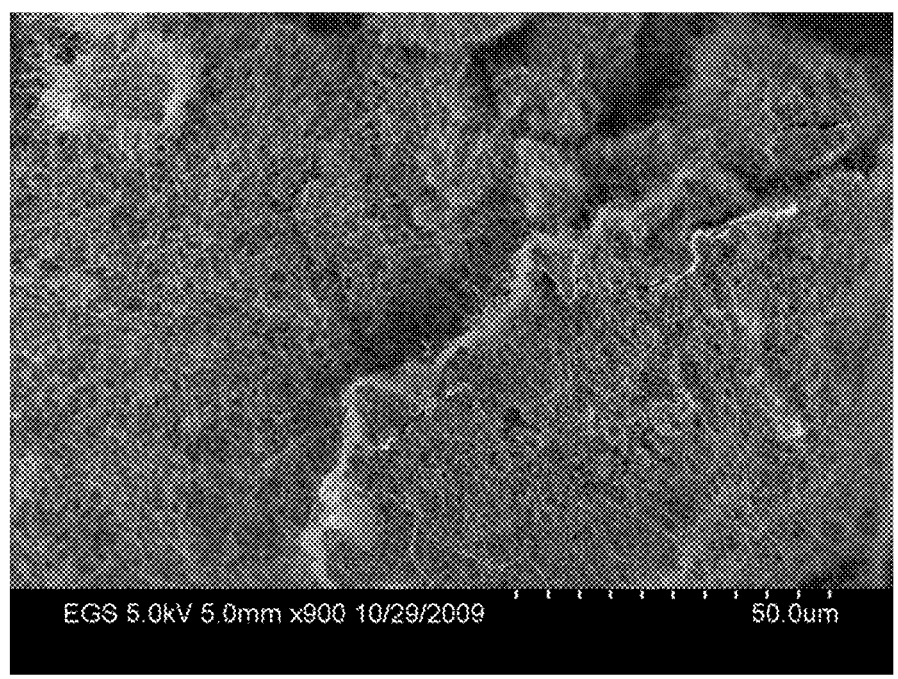
FIG. 4(B) SEM image of Si nanowires grown from Si particles with the presence of graphene sheets.
Figure 5:
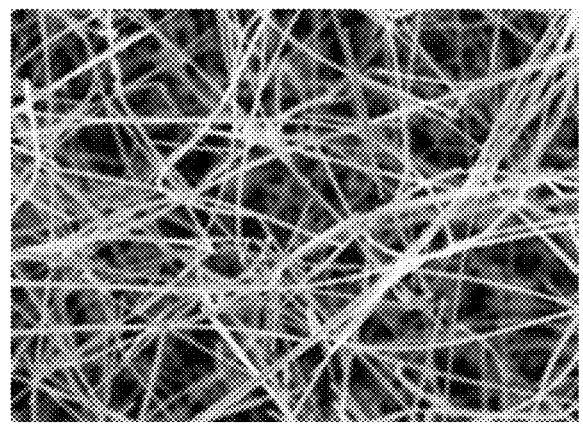
FIG. 5 SEM image of Ge nanowires.
Figure 6A:
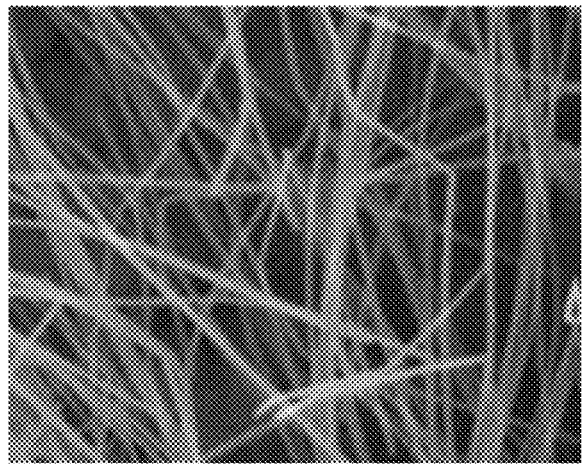
FIG. 6(A) SEM image of Sn nanowires.
Figure 6B:
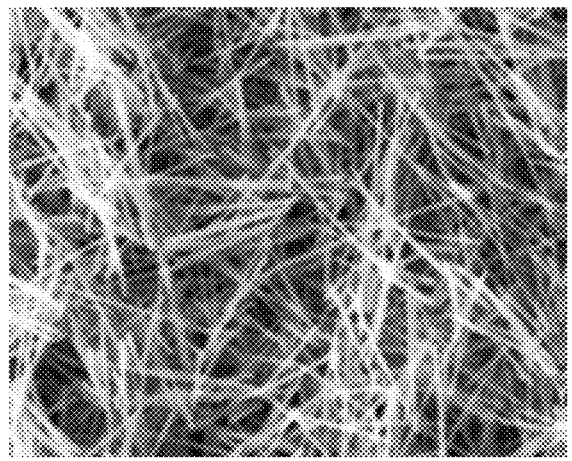
FIG. 6(B) SEM image of Sn nanowires grown in the presence of graphene sheets.

Studies using scanning electron microscopy (SEM) indicate that tens of nanowires can be grown or "extruded out" from a starting solid semiconductor particle. As an example, FIG. 4(A) shows that tens of Si nanowires have been sprouted or emanated from each Si particle that was originally 2-5 µm in diameter. These Si nanowires have drawn the needed Si atoms from the few starting Si particles. By spitting out a large number of nanowires, the original Si particles, if smaller than 2 µm in diameter, were fully expended. When larger particles having an original diameter >3 µm were used, there were typically some residual Si particles left. By spitting out such a large number of nanowires, the original Si particles (without the help from graphene sheets) were reduced to approximately 0.6 µm in diameter. With the presence of graphene sheets, essentially all the micron or sub-micron Si particles are totally "eaten"; there is typically no residual Si particles left and there are a huge number of finer Si nanowires produced (e.g. FIG. 4(B). SEM images of Ge nanowires and Sn nanowires are shown in FIG. 5 and FIGS. 6(A) & 6(B), respectively.

There are several advantages associated with this process. For instance, there is no chemical reaction (such as converting $SiH_4$ into Si in a CVD process) and the process does not involve any undesirable chemical, such as silane, which is toxic. There is no danger of explosion, unlike the process of converting $GeO_2$ to Ge or $SiO_2$ to Si using magnesium vapor. Other additional advantages will become more transparent later.

Figure 1A:
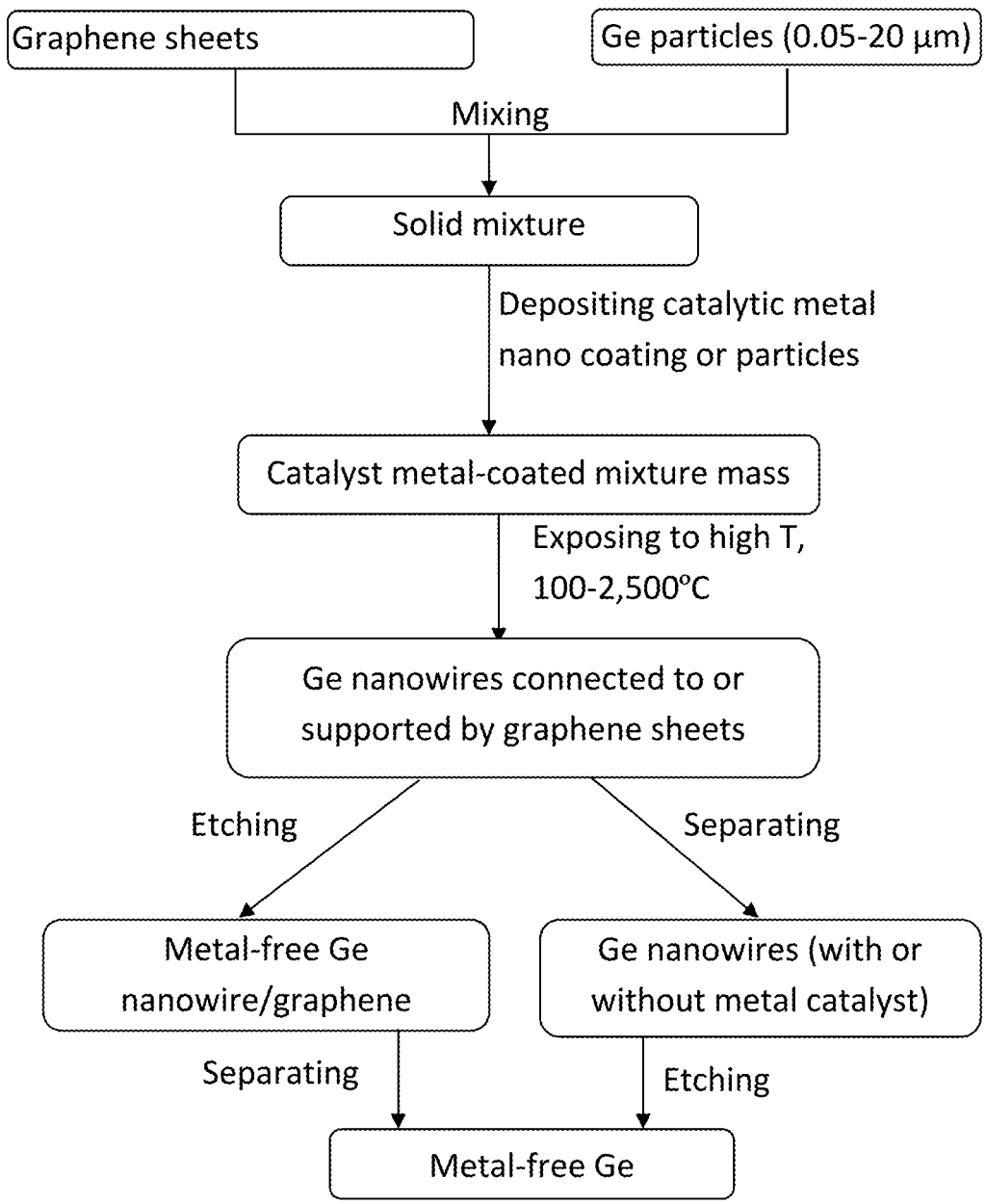
FIG. 1(A) A flow chart showing a preferred route to preparing semiconductor nanowires from particles of the same semiconductor material, having a diameter from 50 nm to 100 µm; using Ge as an example.
Figure 1B:
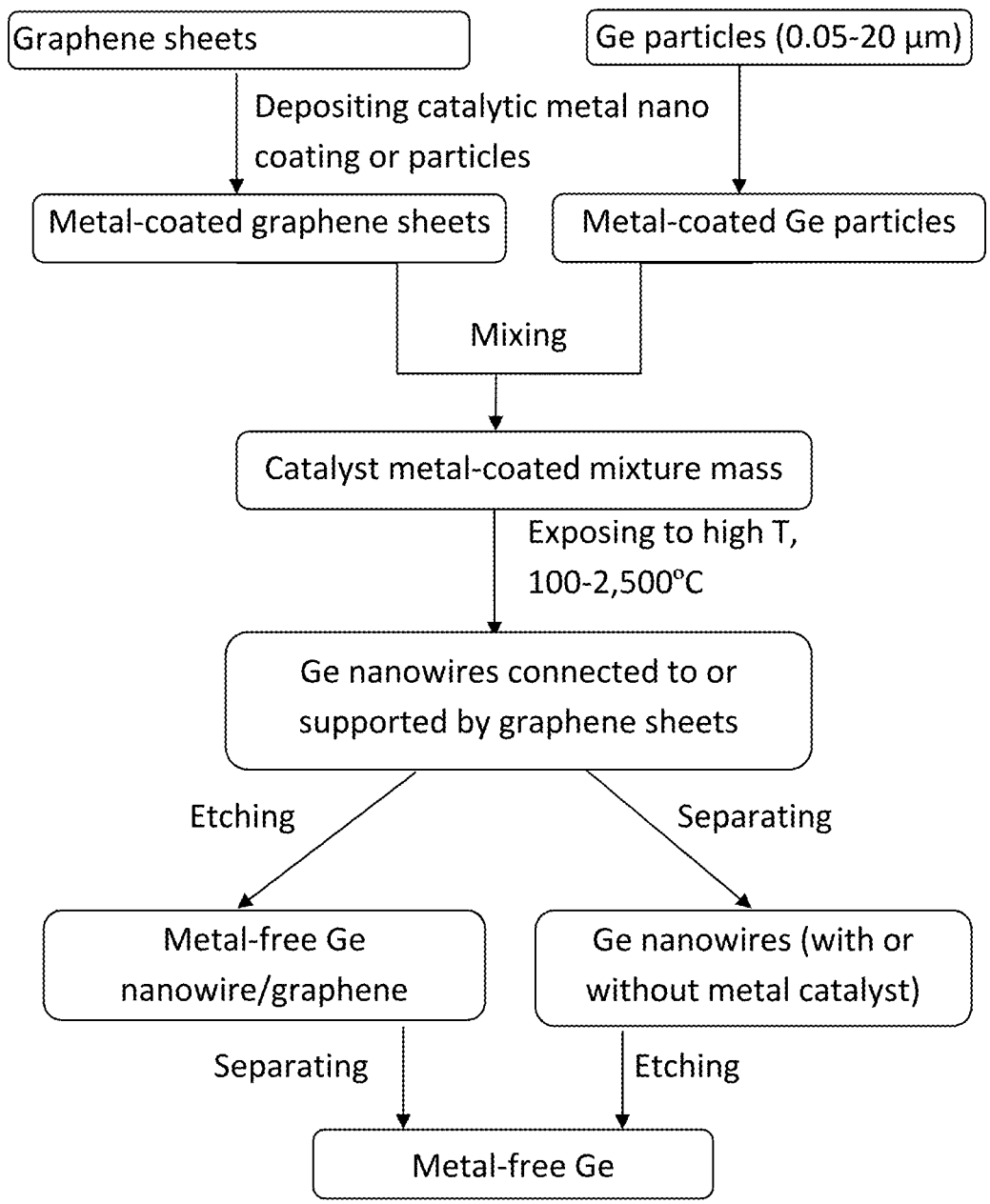
FIG. 1(B) A flow chart showing a preferred route to preparing semiconductor nanowires from particles of the same semiconductor material, having a diameter from 50 nm to 100 µm, using Ge as an example.

As illustrated in FIGS. 1(A) and 1(B), this process begins by preparing a catalyst metal-coated mixture mass (Procedure A), which includes (a) mixing exfoliated graphite flakes (having a thickness from 100 nm to 1 µm) or graphene sheets (having a thickness less than 10 nm) with micron or sub-micron scaled semiconductor particles to form a mixture and (b) depositing a catalytic metal onto surfaces of the graphene sheets (or expanded graphite flakes) and/or surfaces of the semiconductor particles. The step (a) of mixing and step (b) of catalyst metal deposition can occur sequentially (i.e. (a) after (b), or (b) after (a)), or concurrently. Preferably, the graphene sheets or exfoliated graphite flakes are positioned to have as many contact spots with semiconductor particles as possible. This can be accomplished by wrapping semiconductor particles with graphene sheets or exfoliated graphite flakes.

The catalytic metal is preferably in the form of a nano-scaled coating (having a thickness less than 100 nm, preferably less than 50 nm, more preferably less than 20 nm, and most preferably less than 10 nm) or nano-scaled particles (having a diameter less than 100 nm, preferably less than 50 nm, more preferably less than 20 nm, and most preferably less than 10 nm). Thinner metal coating or smaller particles of metal are more effective in producing a larger number of smaller semiconductor nanowires, which are preferred features when it comes to using semiconductor nanowires as an anode active material of a lithium-ion battery.

In Procedure B, the catalyst metal-coated mixture mass is then exposed to a high temperature environment (preferably from 100° C. to 2,500° C., more preferably from 200° C. to 1,500° C., and most preferably and typically from 300° C. to 1,200° C.) for a period of time sufficient to enable a catalytic metal-catalyzed growth of multiple semiconductor nanowires. These semiconductor nanowires are emanated or extruded out from the semiconductor particles, which act as the source material for the growing semiconductor nanowires to feed on. Additionally, even larger numbers of semiconductor nanowires are emanated from surfaces of exfoliated graphite flakes or graphene sheets. This is most striking because there was no semiconductor material pre-deposited on surfaces of graphene sheets or exfoliated graphite flakes. The resulting mass is a hybrid material composed of graphene sheets and semiconductor nanowires (plus residual metal nanoparticles). The semiconductor nanowires have a diameter from 1 nm to 100 nm (more typically 2-20 nm) and a length that is typically 1-1000 μm (more typically 10-30 μm); hence, a length-to-diameter aspect ratio more typically from 10 to 10,000 (most typically from 100 to 1,000).

The graphene material (graphene sheets) may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof. Preferably, the graphene material is selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes. The preparation of graphene materials and exfoliated graphite will be described in details in later sections and several examples.

The starting semiconductor particles preferably have a diameter from 100 nm to 10 μm, more preferably <3 μm. The starting semiconductor particles are preferably spherical, cylindrical, or platelet (disc, ribbon, etc.) in shape, but can be of any shape. Semiconductor particles of various shapes and various particle sizes are commercially available.

Figure 2:
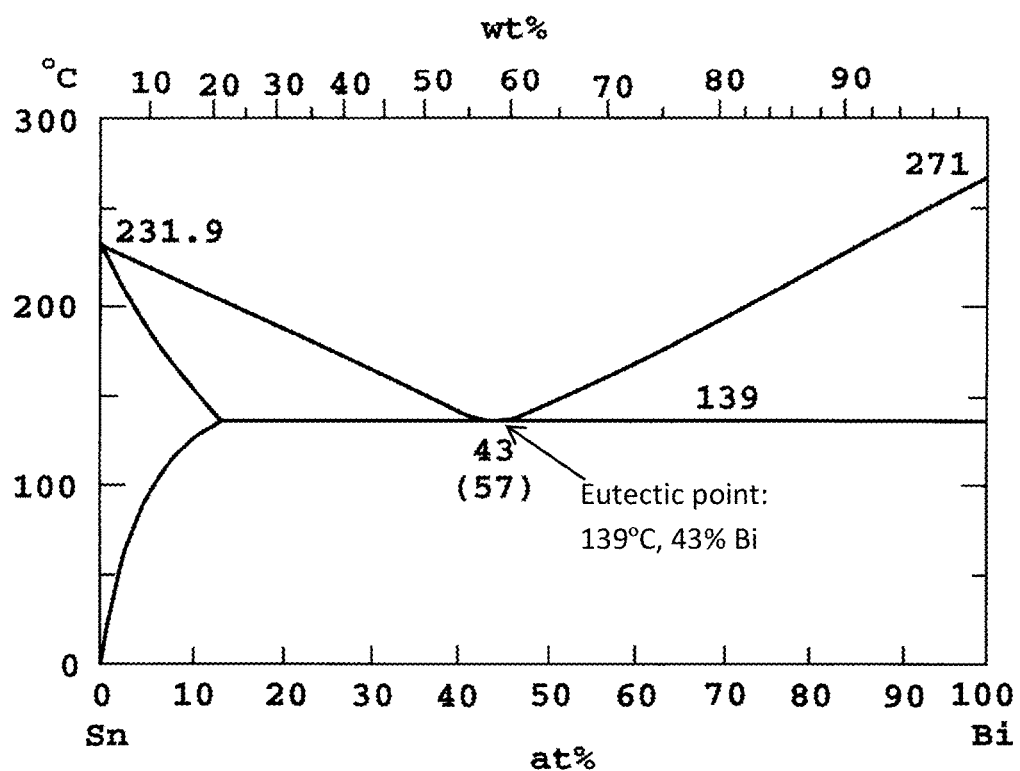
FIG. 2 Phase diagram of the Bi—Sn system.
Figure 3:
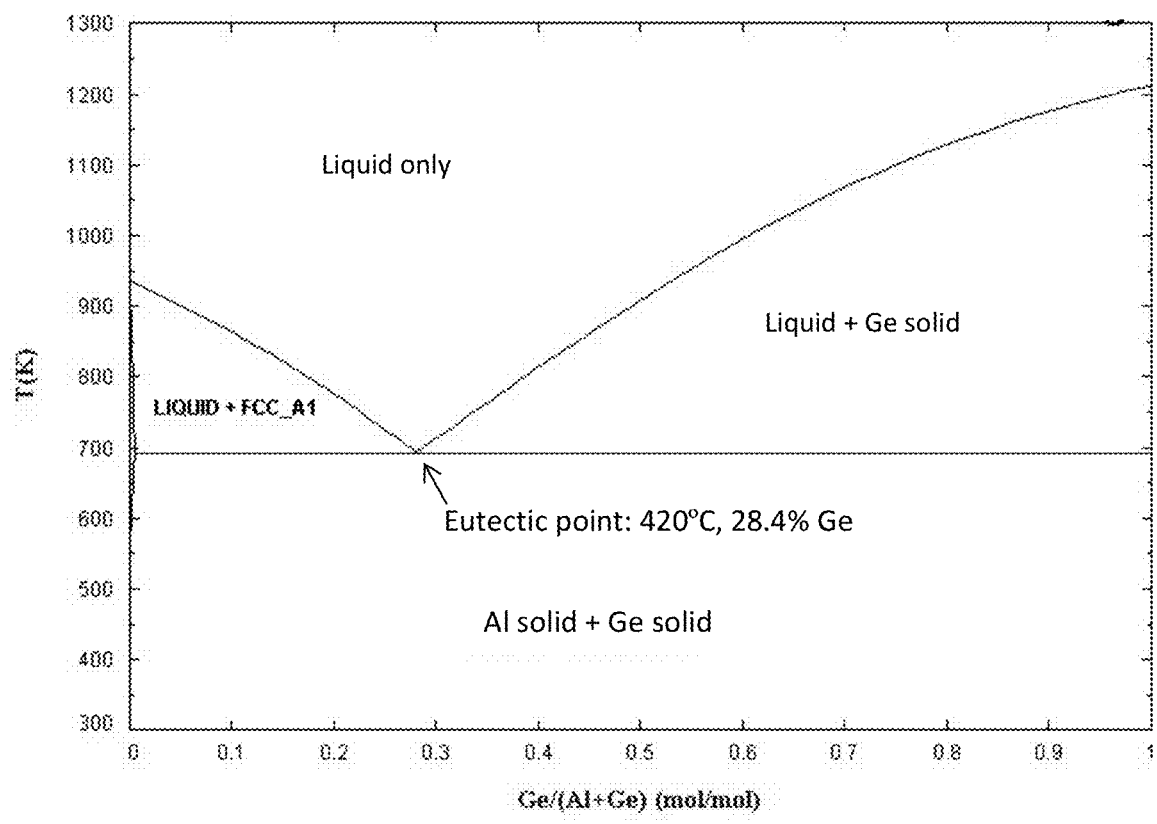
FIG. 3 Phase diagram of the Al—Ge system.

It may be noted that this high temperature range depends on the catalytic metal used. Two examples are used herein to illustrate the best mode of practice. Shown in FIG. 2 and FIG. 3 are phase diagrams of the Sn—Bi and Ge—Al system, respectively. In the first example, Sn is the semiconductor material and Bi is the catalyst metal and, in the second example, Ge is the semiconductor and Al is the catalyst metal.

In the Sn—Bi binary system, there exists a eutectic point at a eutectic temperature Te=139° C. and eutectic composition Ce=46% (atomic percentage of Bi). A mass of Bi-coated Sn particles and Bi-coated graphene sheets or exfoliated graphite flakes may be slowly heated to above Te (e.g. a high temperature from 139.5° C. to 230° C., lower than both the melting temperature of the semiconductor, 231.9° C., and the melting temperature of the catalyst metal, 271° C.). The heating rate can be from 1 to 100 degrees/min (centigrade scale). One can allow the Bi-coated Sn particles and graphene sheets or exfoliated graphite flakes to stay at this high temperature (say 170° C.) for 1 minute to 3 hours and then cool the material down to 145° C. (slightly above Te) and/or even 135° C. (slightly below Te) for 1-180 minutes. This will lead to the formation of Sn nanowires from the coated Sn particles.

In the Ge—Al binary system, there exists a eutectic point at a eutectic temperature Te=420° C. and eutectic composition Ce=71.6% (atomic percentage of Al). A mass of Al-coated Ge particles and graphene sheets or exfoliated graphite flakes may be slowly heated to above Te (e.g. a high temperature from 421° C. to 600° C., lower than both the melting temperature of the semiconductor, 938.2° C., and the melting temperature of the catalyst metal, 660.3° C.). The heating rate can be from 1 to 100 degrees/min (centigrade scale). One can allow the Al-coated Ge particles and graphene sheets or exfoliated graphite flakes to stay at this high temperature (say 460° C.) for 1 minute to 3 hours and then cool the material down to 430° C. (slightly above Te) and/or even 415° C. (slightly below Te) for 1-180 minutes. This will lead to the formation of Ge nanowires from the coated Sn particles. Alternatively, one may choose to cool the materials slowly down from 460° C. (after staying at this temperature for a desired period of time) to room temperature.

In some embodiments, the step of depositing a catalytic metal includes: (a) dissolving or dispersing a catalytic metal precursor in a liquid to form a precursor solution; e.g. dissolving nickel nitrate, $Ni(NO_3)_2$, in water; (b) bringing the precursor solution in contact with surfaces of semiconductor particles and graphene sheets or exfoliated graphite flakes; e.g. immersing the particles/sheets/flakes into the $Ni(NO_3)_2$-water solution; (c) removing the liquid component; e.g. vaporizing water of the $Ni(NO_3)_2$-water solution, allowing $Ni(NO_3)_2$ to coat on the surfaces of the semiconductor particles and graphene sheets or exfoliated graphite flakes; and (d) chemically or thermally converting the catalytic metal precursor (e.g. $Ni(NO_3)_2$) to the catalytic metal coating or metal nanoparticles; e.g. by heating the $Ni(NO_3)_2$-coated mass at 450-650° C. in a reducing environment (e.g. in a flowing gas mixture of hydrogen and argon).

In one embodiment, the step (d) of chemically or thermally converting the catalytic metal precursor is conducted concurrently with the step of exposing the catalyst metal-coated semiconductor particles and graphene sheets or exfoliated graphite flakes to a high temperature environment.

In certain embodiments, the catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof.

In some preferred embodiments, the catalytic metal precursor is selected from a nitrate, acetate, sulfate, phosphate, hydroxide, or carboxylate of a metal selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof.

In some embodiments, the catalytic metal precursor is selected from a nitrate, acetate, sulfate, phosphate, hydroxide, or carboxylate of a transition metal. In certain embodiments, for instance, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper carboxylate, nickel carboxylate, cobalt carboxylate, manganese carboxylate, iron carboxylate, titanium carboxylate, aluminum carboxylate, or a combination thereof. Given the same semiconductor particles, different types of precursor require different temperatures and/or chemical reactants for conversion to the catalytic metal phase. Different catalytic metals enable semiconductor nanowire growth at different temperatures.

The step of depositing a catalytic metal may also be conducted by a procedure of physical vapor deposition (PVD), chemical vapor deposition (CVD), sputtering, plasma deposition, laser ablation, plasma spraying, ultrasonic spraying, printing, electrochemical deposition, electrode plating, electrodeless plating, chemical plating, or a combination thereof.

The step of mixing the semiconductor particles and graphene sheets is conducted by liquid solution mixing, homogenizer mixing, high shearing mixing, wet milling, air milling, or ball-milling.

In an alternative embodiment, the mixing of graphene sheets with micron or sub-micron scaled semiconductor particles is conducted after surfaces of the graphene sheets and/or the semiconductor particles are deposited with the catalytic metal. This can be accomplished by using the above-described solution deposition procedure (i.e. dissolving nickel nitrate, copper acetate, etc. in a liquid, followed by liquid removal). Alternatively, ultra-thin coating or nanoparticles of a catalytic metal may be deposited on the surfaces of semiconductor particles, graphene sheets, or exfoliated graphite flakes using sputtering, physical vapor deposition, chemical vapor deposition, laser ablation, etc.

The mixing of metal-coated graphene sheets (or exfoliated graphite flakes) with metal-coated micron or sub-micron scaled semiconductor particles is conducted in such a manner that the resulting mixture is in a form of porous secondary particles having a diameter from 1 μm to 20 μm and having mesopores therein from 2 nm to 100 nm in size.

The procedure of exposing the catalyst metal-coated mixture mass to a high temperature environment is preferably conducted in a protective or reducing atmosphere of an inert gas, nitrogen gas, hydrogen gas, a mixture thereof, or in a vacuum.

It may be noted that the present process appears to enable semiconductor nanowires to grow from both original semiconductor particle surfaces and surfaces of graphene sheets or exfoliated graphite flakes. A highly unexpected observation is the notion that a huge number of semiconductor nanowires appear to grow out of surfaces of graphene sheets or exfoliated graphite flakes as well. These semiconductor nanowires appear to emanate from these sheet/flake surfaces everywhere, even though that there was no pre-deposited semiconductor material on these surfaces and there were limited initial contact points between graphene sheets and original semiconductor particles (i.e. there was very limited amount of semiconductor on graphene surfaces). With the presence of graphene sheets or thin exfoliated graphite flakes, the number of semiconductor nanowires is typically 1 or 2 orders of magnitude larger than that in the samples containing semiconductor particles alone, without the presence of metal-coated graphene sheets or graphite flakes. Additionally, the resulting semiconductor nanowires are significantly smaller in diameter, typically thinner than 35 nm (more typically from 2 nm to 20 nm), in contrast to the typically >35 nm (more typically >50 nm and most typically >60 nm) for those semiconductor nanowires grown directly from original semiconductor particles. Furthermore, metal-coated graphene sheets were found to be more effective than metal-coated exfoliated graphite flakes in emanating thin semiconductor nanowires. These are highly desirable attributes considering that smaller semiconductor nanowire diameters imply shorter diffusion paths for lithium ions and, hence, faster charge and discharge procedures for the lithium-ion batteries.

Typically, in the resulting hybrid material, multiple graphene sheets and catalytic metals are present along with the produced semiconductor nanowires. For certain applications, one may choose to use semiconductor nanowires without graphene. Hence, in an embodiment, the process may further comprise a procedure of separating the graphene sheets from the silicon nanowires.

In one embodiment, the process may further comprise a procedure of removing the residual catalytic metal from the semiconductor nanowires; for instance, via chemical etching or electrochemical etching.

In a desired embodiment, the process of producing semiconductor nanowires is followed by a procedure of incorporating a carbonaceous or graphitic material into the mass of multiple silicon nanowires as a conductive additive in the preparation of an anode electrode. This carbonaceous or graphitic material may be selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

For instance, multiple semiconductor nanowires may be readily packed into a porous membrane or mat (with or without a small amount of resin binder), which may be impregnated or infiltrated with carbon under a chemical vapor deposition (CVD) or chemical vapor infiltration condition. This may be accomplished by introducing methane or ethylene gas into the system at a temperature of 500-1,500° C. Alternatively, one may impregnate the porous semiconductor nanowire membrane with a resin or pitch, which is then heated to carbonize the resin or pitch at a temperature of 350-1,500° C. Alternatively, one may simply blend semiconductor nanowires with particles of a carbon or graphite material with an optional binder resin to form a multi-component mixture.

The following is a more detailed description of the procedures that can be used to produce exfoliated graphite flakes and various types of graphene sheets:

In a preferred embodiment, the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The electrode material may be selected from an exfoliated graphite material. The starting graphitic material for producing any one of the above graphene or exfoliated graphite materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nanographene platelets" (NGPs). Graphene sheets/platelets (collectively, NGPs) are a new class of carbon nanomaterial (a 2-D nanocarbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

Figure 7:
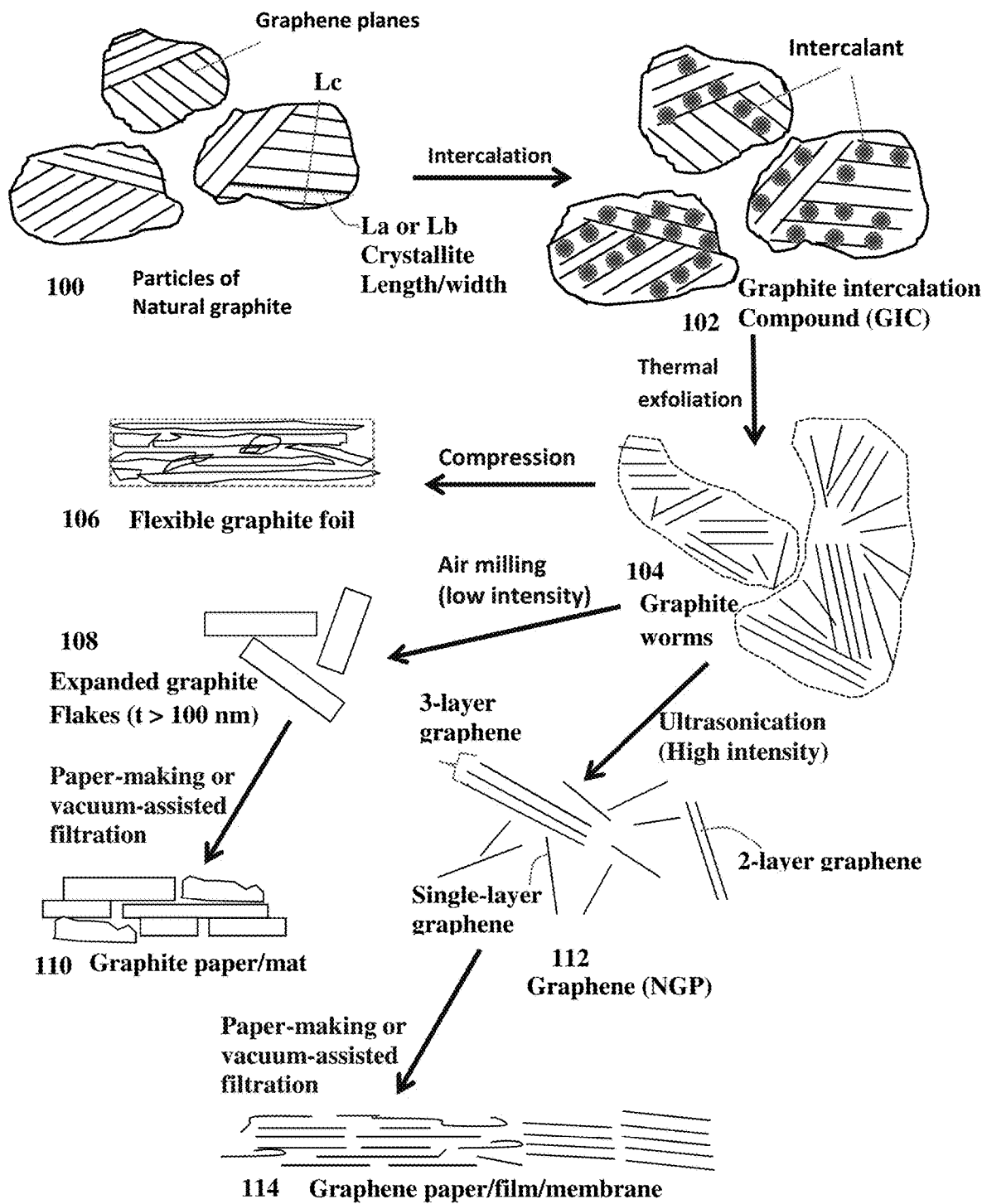
FIG. 7 Schematic drawing to illustrate the process for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 7) (schematic drawing). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 7)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nanomaterial by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 µm to 10 µm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 7, a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 7, different crystallites in a graphite particle are typically oriented in different directions and, hence, a particular property of a multi-crystallite graphite particle is the directional average value of all the constituent crystallites.

Figure 8A:
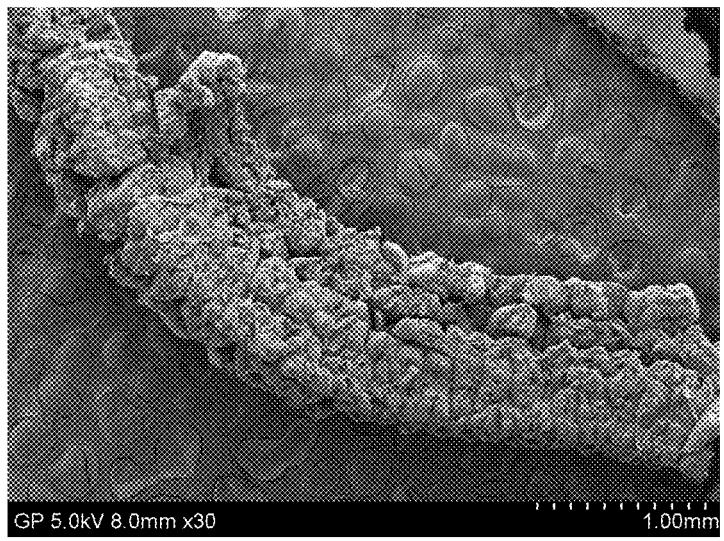
FIG. 8(A) SEM images of exfoliated graphite worms imaged at a low magnification.
Figure 8B:
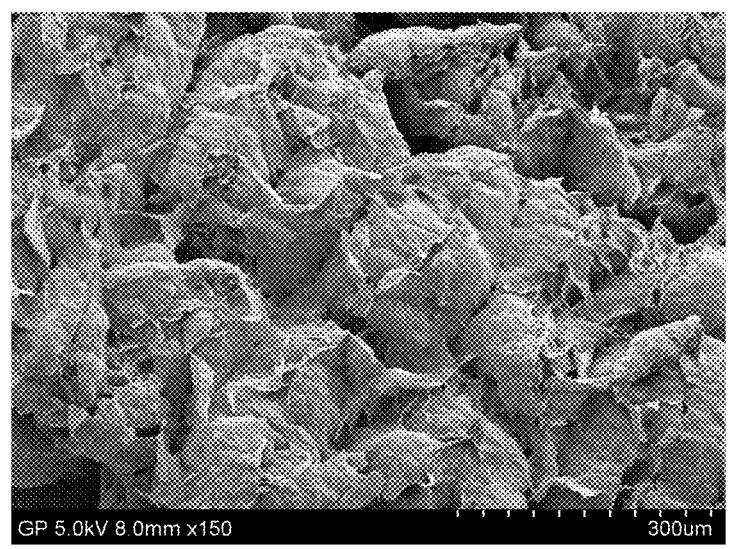
FIG. 8(B) Same graphite worm as in FIG. 8(A), but taken at a higher magnification FIG. 9 The effect of nanowire diameter on the rate capability of an anode active material in a lithium-ion battery.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 7) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. Examples of exfoliated graphite worms (or, simply, graphite worms) are presented in FIG. 8(A) and FIG. 8(B). These worms of graphite flakes can be subjected to a low-intensity mechanical shearing to produce flakes of exfoliated graphite, also sometimes referred to as expanded graphite flakes. High-intensity shearing of graphite worms tends to produce graphene sheets, also referred to as nanographene platelets (NGPs).

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to a high-intensity mechanical shearing/separation treatment using a high-intensity air jet mill, high-intensity ball mill, or ultrasonic device to produce separated nanographene platelets (NGPs) with all the graphene platelets thinner than 100 nm, mostly thinner than 10 nm, and, in many cases, being single-layer graphene (also illustrated as 112 in FIG. 7). An NGP is composed of a graphene sheet or a plurality of graphene sheets with each sheet being a two-dimensional, hexagonal plane of carbon atoms. Alternatively, with a low-intensity shearing, graphite worms tend to be separated into the so-called expanded graphite flakes (108 in FIG. 7) having a thickness >100 nm.

These flakes, along with starting semiconductor particles, can be formed into porous paper or mat 106 using a paper- or mat-making process, with or without a resin binder. This can be conducted before, during, or after catalytic metal deposition. In one preferred embodiment of the present invention, the porous web can be made by using a slurry molding or a flake spraying technique. These methods can be carried out in the following ways:

As a wet process, aqueous slurry is prepared which comprises a mixture of graphene sheets or expanded graphite flakes and a desired amount of micron or sub-micron semiconductor particles. A water solution of metal salt may also be added to the slurry. The slurry is then directed to impinge upon a sieve or screen, allowing water to permeate through, leaving behind sheets/flakes/particles. The slurry may also be sprayed dried to form secondary particles containing graphene sheets (or exfoliated graphite flakes), semiconductor particles, and catalytic metal salt (if present) coated on surfaces of semiconductor and graphene sheets (or exfoliated graphite flakes).

As a dry process, the directed sheet/flake spray-up process utilizes an air-assisted flake/particle spraying gun, which conveys flakes/sheets/particles to a molding tool (e.g., a perforated metal screen shaped identical or similar to the part to be molded). Air goes through perforations, but the solid components stay on the molding tool surface.

Each of these routes can be implemented as a continuous process. For instance, the process begins with pulling a substrate (porous sheet) from a roller. The moving substrate receives a stream of slurry (as described in the above-described slurry molding route) from above the substrate. Water sieves through the porous substrate with all other ingredients (a mixture of graphene sheets or graphite flakes, optional conductive fillers, and semiconductor particles) remaining on the surface of the substrate being moved forward to go through a compaction stage by a pair of compaction rollers. Heat may be supplied to the mixture before, during, and after compaction to help cure the thermoset binder (if present) for retaining the shape of the resulting web or mat. The web or mat, with all ingredients held in place by the thermoset binder, may be stored first (e.g., wrapped around a roller). Similar procedures may be followed for the case where the mixture is delivered to the surface of a moving substrate by compressed air, like in a directed fiber/binder spraying process. Air will permeate through the porous substrate with other solid ingredients trapped on the surface of the substrate, which are conveyed forward. The subsequent operations are similar than those involved in the slurry molding route.

Other processes that can be used to produce mixtures of semiconductor particles and graphene sheets or exfoliated graphite flakes include, for instance, spray drying of slurry containing the mixture, wet milling, ball milling, impact milling, tumbling drying, freeze-drying, etc.

In a desired embodiment, the process of producing a graphene-semiconductor nanowire hybrid material composition further comprises a procedure of incorporating a carbonaceous or graphitic material into the graphene-semiconductor nanowire hybrid material composition as a conductive additive. This carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

For instance, the graphene-semiconductor nanowire hybrid material composition, in a porous membrane form, may be impregnated or infiltrated with carbon under a chemical vapor deposition (CVD) or chemical vapor infiltration condition. This may be accomplished by introducing methane or ethylene gas into the system at a temperature of 500-1,500° C. Alternatively, one may impregnate the porous graphene-semiconductor nanowire hybrid material composition with a resin or pitch, which is then heated to carbonize the resin or pitch at a temperature of 350-1,500° C. Alternatively, one may simply mix the particulates of graphene-semiconductor nanowire hybrid material composition with particles of a carbon or graphite material to form a multi-component mixture.

The following examples are provided for the purpose of illustrating the best mode of practicing the present invention and should not be construed as limiting the scope of the instant invention. The selection of the following semiconductor materials as examples is based on the consideration that they have a high specific capacity when used as an anode active material: $Li_{4.4}Ge$ (1,623 mAh/g), $Li_{4.4}Sn$ (993 mAh/g), and $Li_3Sb$ (660 mAh/g).

Example 1: Preparation of Graphene Oxide (GO) and Reduced GO Nanosheets from Natural Graphite Powder and their Porous Paper/Mats Containing Ge Particles and/or Metal Salt Natural graphite was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation procedure, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt. % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt. % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. A desired amount of Ge particles were then added to the GO-water suspension to form a slurry sample.

Chemical reduction of as-obtained GO to yield RGO was conducted by using the following method: The procedure began with placing 10 mL of a 0.1 wt. % GO aqueous solution in a boiling flask of 50 mL. Then, 10 µL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction. A desired amount of Ge particles were then added to the suspensions (RGO in surfactant water) to form a slurry sample.

These GO-Ge and RGO-Ge slurry samples were then filtered through a vacuum-assisted membrane filtration apparatus to obtain porous layers (membranes) of GO-Ge and RGO-Ge paper or mat. These mat/paper membranes were then impregnated with a solution of nickel nitrate, iron nitrate, and copper acetate in water. Water was subsequently removed from the impregnated membranes and the dried membranes were then exposed to a reducing atmosphere of $H_2$ and Ar gas following a desired temperature profile, typically from room temperature to a reduction temperature of approximately 300-700° C. (for reduction of nickel nitrate to Ni nano-coating, for instance). The temperature was continued to rise to a final temperature of 762-900° C. for 1-3 hours and the system was allowed to cool down naturally. Ge nanowires were found to emanate from both existing Ge particles and graphene sheets (both GO and RGO sheets, separately). The diameter of the Ge nanowires was observed to be from approximately 12 nm to 30 nm.

Comparative Example 1a: Nickel-Assisted Growth of Ge Nanowires from Ge Particles Ge Particles were Immersed in a Solution of Nickel Nitrate or Nickel Acetate in Water Water was subsequently removed and the dried particles were coated with a thin layer of nickel nitrate or nickel acetate. These metal precursor-coated Ge particles were then exposed to a heat treatment in a reducing atmosphere of $H_2$ and Ar gas according to a desired temperature profile. This profile typically included from room temperature to a reduction temperature of approximately 300-700° C. (for reduction of nickel nitrate or acetate to Ni nano-coating, for instance). The temperature was continued to rise to a final temperature of 762-900° C. for 1-3 hours and the system was allowed to cool down naturally. Nickel metal catalyst-assisted growth of Ge nanowires from Ge particles was found to occur. The diameter of Ge nanowires produced was in the range from 47 nm to 77 nm.

Example 2: Preparation of Single-Layer Graphene Sheets and Porous Graphene Mats from Meso-Carbon Micro-Beads (MCMBs) to Support/Promote Growth of Nanowires Meso-carbon micro-beads (MCMBs) were supplied from China Steel Chemical Co., Kaohsiung, Taiwan. This material has a density of about 2.24 g/cm$^3$ with a median particle size of about 16 µm. In one example, MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The GO suspension was then diluted to approximately 0.5% by weight in a container. A desired amount of aluminum sulfate was dissolved in water to form a metal salt solution. The metal salt solution was then added into a GO suspension, followed by addition of Ge particles to form a slurry sample. The slurries were allowed to age in the container without mechanical disturbance. The slurries were then cast onto a glass surface using a doctor's blade to exert shear stresses, inducing GO sheet orientations. The resulting GO/Ge/metal salt films, after removal of liquid, have a thickness that can be varied from approximately 10 to 500 µm. The resulting GO/Ge/metal salt compact was then subjected to heat treatments at a temperature of 400-650° C. for 1-5 hours. This heat treatment concurrently accomplishes four things: reduction of GO to RGO, reduction of Al metal salt to Al metal nano-coating, formation of pores (2 nm-10 µm) due to evolution of volatile reaction product species (e.g. $CO_2$, $H_2O$, etc.), and catalytic growth of Ge nanowires from Ge particles and graphene sheets.

As a baseline experiment, we have also prepared a slurry containing Ge particles (but no graphene sheets) in water with a corresponding metal salt dissolved therein. This was followed by casting and heat-treating under comparable conditions for comparison purposes.

In each sample containing graphene, a huge number of Ge nanowires appear to have grown out of graphene sheet surfaces. These Ge nanowires appear to emanate from everywhere on these sheet surfaces. With the presence of graphene sheets, the number of Ge nanowires is typically 1 or 2 orders of magnitude larger than that in the samples containing Ge particles alone, without the presence of graphene sheets. Additionally, the resulting Ge nanowires emanated from graphene surfaces are significantly smaller in diameter, typically thinner than 20 nm (more typically 7-18 nm), in contrast to the typically >35 nm for those Ge nanowires grown directly from original Ge particles. Nanowires having a smaller diameter are more high-rate capable, being able to deliver a higher specific capacity when the lithium-ion battery is charged or discharged.

Example 3: Copper-Assisted Growth of Sb Nanowires from Sb Particles and Graphene/Sb Mixtures The work began with the preparation of antimony (Sb) particles, which entailed mixing $Sb_2O_3$ particles with small activated carbon (AC) particles using ball milling. By heating the resulting mixture in a sealed autoclave and heating the mixture to 950° C., antimony was obtained from the oxide by a carbothermal reduction: $2\ Sb_2O_3 + 3C \rightarrow 4Sb + 3CO_2$. The Sb particles produced typically resided in pores of AC, which could be recovered by breaking up the AC particles with ball-milling.

The Sb particles, with or without graphene sheets, were immersed in a solution of copper acetate in water. Water was subsequently removed and consequently the dried particles were coated with a thin layer of copper acetate. These metal precursor-coated Sb particles alone, or with metal precursor-coated graphene sheets, were then exposed to a heat treatment in a reducing atmosphere of $H_2$ and Ar gas according to a desired temperature profile. This profile typically included from room temperature to a reduction temperature of approximately 300-600° C. (for reduction of copper acetate to Cu nano-coating). The temperature was continued to rise to a final temperature of 526-620° C. for 1-3 hours. The system was allowed to cool down to 520° C. for 1 hour and then cooled down naturally to room temperature, resulting in copper metal catalyst-assisted growth of Sb nanowires from Sb particles. Again, the presence of graphene sheets leads to the growth of a dramatically larger number of smaller-diameter Sb nanowires.

Example 4: Preparation of Pristine Graphene Sheets/Platelets (0% Oxygen) and the Effect of Pristine Graphene Sheets on Semiconductor Nanowire Growth Pristine graphene sheets (non-oxidized and oxygen-free) were produced by using the direct ultrasonication or liquid-phase production process. In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free.

Several approaches were followed to produce Ge or Sn nanowire-graphene hybrid materials from pristine graphene sheets and micron-scaled Ge or Sn particles:

(1) Mixing un-coated Ge or Sn particles and un-coated graphene sheets in a precursor catalyst metal salt-water solution to make a slurry, which was then spray-dried to form secondary mixture particulates (3-15 μm in diameter), while concurrently enabling deposition of metal salt onto surfaces of both Ge or Sn particles and graphene sheets;

(2) Mixing metal salt-coated Ge or Sn particles and un-coated graphene sheets (having a specific surface area of 430-885 $m^2/g$) to form secondary mixture particulates; and (3) Mixing un-coated Ge or Sn particles and metal salt-coated graphene sheets (having a specific surface area of 350-790 $m^2/g$) to form secondary mixture particulates.

In the latter two approaches, either Ge/Sn particles or graphene sheets were dispersed in a metal salt-water solution to form a suspension. Subsequently, water was removed to allow for deposition of metal salt onto particle or sheet surfaces. The metal salt was then thermally converted to catalyst metal in the form of nanometal coating or metal nanoparticles deposited on Ge or Sn particle or graphene sheet surfaces. For comparison purposes, deposition of metal catalyst (e.g. Ni, Ag, Au, Zn, Bi, etc.) onto either Ge or Sn particles or various graphene sheets (pristine graphene, RGO, and GO) was also carried out by using sputtering.

By using SEM to examine starting Ge or Sn particles and graphene sheets as well as the resulting Ge or Sn nanowires and Ge or Sn nanowire-graphene hybrid particulates, we made some important discoveries, summarized below:

(A) Hybrid particulates containing both catalyst metal-coated Ge or Sn particles and metal-coated graphene sheets are dramatically more effective in promoting growth of nanowires than those particulates that contain catalyst metal-coated Ge or Sn particles and un-coated graphene sheets and those un-coated Ge or Sn particles and metal-coated graphene sheets. Under comparable conditions, the former produces a dramatically larger number of Ge or Sn nanowires (by 1 to 2 orders of magnitude), and the Ge or Si nanowires are significantly smaller in diameter (typically from 2 nm to approximately 20 nm), in contrast to typically 40-100 nm of Ge or Sn nanowires produced by the latter two types of particulates.

(B) The number of Ge or Sn nanowires that can be emanated from a metal-coated Ge or Sn particle per unit volume of semiconductor particle in a particulate containing un-coated graphene sheets and coated Ge or Sn particles appears to be controlled by the total surface area of the catalytic metal deposited on the Ge or Sn particle per unit volume of Ge or Sn. Un-coated graphene sheets do not seem to contribute to the growth of Ge or Sn nanowires. Larger Ge particles lead to smaller number of Ge nanowires per unit volume of original Ge.

(C) In hybrid particulates that contain un-coated Ge particles and metal-coated graphene sheets, Ge nanowires appear to nucleate mainly from those interface areas where metal-coated graphene sheets contact a Ge particle.

(D) We have further observed that a larger number of smaller-diameter Ge or Sn nanowires, given the same Ge or Sn amount, enable a battery anode active material featuring the presently invented hybrid material to deliver a higher specific capacity at both low and high charge/discharge rates, a higher energy density, higher power density, and longer battery cycle life.

Example 5: Gold-Assisted Growth of Ge Nanowires from Ge Particles

Ge particles (platelets of 1.2 μm long and 0.25 μm thick) and graphene sheets were coated with a thin layer of Au using sputtering deposition up to a thickness of 1.5-5.6 nm. The Ge—Au system is known to have a eutectic point at Te=361° C. and Ce=28% Ge. Samples of a powder mass of Au-coated Ge particles, with or without graphene sheets, were heated to 600° C. and allowed to stay at 600° C. for 2 hours and then cooled down to 370° C. and maintained at 370° C. for 1 hour. The material systems were then cooled to 355° C. for 2 hours and then naturally cooled to room temperature after switching off the power to the oven.

Gold catalyst-assisted growth of Ge nanowires from Ge particles occurred during the subsequent cooling process. The diameter of Ge nanowires produced without the presence of graphene sheets was in the range from 42 nm to 67 nm. With assistance from graphene sheets, the diameter of Ge nanowires was from 15 to 27 nm. Nanowires having a smaller diameter are more high-rate capable, being able to deliver a higher specific capacity when the lithium-ion battery is charged or discharged.

Example 6: Zinc-Assisted Growth of Sn Nanowires from Sn Particles with or without Graphene Sheets or Exfoliated Graphite Flakes Tin particles, graphene sheets, and exfoliated graphite flakes were coated with a thin layer of Zn using a physical vapor deposition procedure for up to a thickness of 1.1-3.5 nm. The Sn—Zn system is known to have a eutectic point at Te=198.5° C. and Ce=85.1% Sn. A powder mass of Zn-coated Sn particles (3.5 μm in diameter), with or without graphene sheets/exfoliated graphite flakes, were heated to 220° C. and allowed to stay at 220° C. for 1 hour and then cooled down to 200° C. and maintained at 200° C. for 30 minutes. The material system was then naturally cooled to room temperature after switching off the power to the oven. The Sn nanowires grown from Sn particles without the assistance from graphene sheets were found to have diameters in the approximate range of 25-65 nm. In the presence of graphene sheets and exfoliated graphite flakes, the Sn nanowires having a diameter range of 10-21 nm and 15-25 nm, respectively.

Example 7: Preparation of Graphene Fluoride (GF) Nanosheets and Sn Nanowire Growth Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, or isoamyl alcohol) and subjected to an ultrasound treatment (280 W) for 30 min, leading to the formation of homogeneous yellowish dispersions. Five minutes of sonication was enough to obtain a relatively homogenous dispersion of few-layer graphene fluoride, but longer sonication times ensured the production of mostly single-layer graphene fluoride sheets. Some of these suspension samples were subjected to vacuum oven drying to recover separated graphene fluoride sheets.

These graphene fluoride (GF) sheets were then deposited with Bi, using sputtering. The resulting mass of metal-coated GF still maintains a specific surface area of 220-550 $m^2/g$. Subsequently, Sn particles were also deposited with Bi and then blended with Bi-coated graphene fluoride sheets to form secondary particulates.

A mixture mass of Bi-coated Sn particles and Bi-coated graphene sheets or exfoliated graphite flakes was slowly heated to above the eutectic temperature Te (e.g. up to a high temperature from 139.5° C. to 230° C.). As a control sample, a mass of Bi-coated Sn particles was also subjected to identical heat treatments. The heating rate can be from 1 to 100 degrees/min (centigrade scale). The Bi-coated Sn particles, with or without Bi-coated graphene sheets or exfoliated graphite flakes, were allowed to stay at this high temperature (e.g. 170° C.) for 1 hour and then cool the material down to 145° C. (slightly above Te) and, in one case, to 135° C. (slightly below Te) for 30 minutes. Again, the Sn nanowires from the coated Sn particles alone have a larger diameter.

Example 8: Preparation of Nitrogenated Graphene Nanosheets and Porous Graphene Structures Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratio of 1/1 had a nitrogen content of 18.2 wt. % as determined by elemental analysis. These nitrogenataed graphene sheets remain dispersible in water.

Si-doped Ge particles (3 at. % Si) and a metal salt (nickel acetate) were dispersed/dissolved in the nitrogenataed graphene-water suspension to form a slurry. A slurry containing Ni acetate and Si-doped Ge particles alone, without graphene, was also prepared for comparison purposes. Subsequently, metal salt-coated hybrid particulates were obtained by spray-drying the slurry. The hybrid particulates were gradually heated in a hydrogen-argon gas mixture from room temperature to 780-900° C. for Ni-assisted growth of Ge—Si nanowires. Thin Ge—Si nanowires were grown in situ inside the graphene-encapsulated particulates. The observation was made using SEM after the particulates were cut to reveal the cross-sections.

Example 9: Exfoliated Graphite Worms from Natural Graphite

Natural graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms.

Some of the graphite worms were then mixed with Ge or Sn particles and the resulting mixture was exposed to metal cloud in a sputtering chamber. The metal-coated mixture was roll-pressed to obtain samples of re-compressed exfoliated graphite having a range of physical densities (e.g. 0.3 to 1.2 g/cm$^3$).

Some of the graphite worms were subjected to low-intensity sonication to produce separated (isolated) expanded graphite flakes. These expanded graphite flakes, after blended with semiconductor particles and metal salt in water solution, were then cast into layers of porous membrane.

The Ge-exfoliated graphite mixtures (both types of membrane) were gradually heated in a hydrogen-argon gas mixture from room temperature to 762° C., maintained at 762° C. for 30 minutes, and then raised to 800° C. for 30 minutes and decreased back to 770° C. for 2 hours. These conditions were found to produce large numbers of Ge nanowires.

Example 10: Exfoliated Graphite Worms from Various Synthetic Graphite Particles or Fibers Additional exfoliated graphite worms were prepared according to the same procedure described in Example 7, but the starting graphite materials were graphite fiber (Amoco P-100 graphitized carbon fiber), graphitic carbon nano-fiber (Pyrograph-III from Applied Science, Inc., Cedarville, Ohio), spheroidal graphite (HuaDong Graphite, QinDao, China), and meso-carbon micro-beads (MCMBs) (China Steel Chemical Co., Taiwan), respectively. These four types of laminar graphite materials were intercalated and exfoliated under similar conditions as used for Example 1 for different periods of time, from 24 hours to 96 hours.

Some of the graphite worms were then mixed with Sn particles and the resulting mixture was then coated with Zn. The metal-coated mixture was roll-pressed to obtain samples of re-compressed exfoliated graphite having a range of physical densities (e.g. 0.3 to 1.2 g/cm$^3$). Some of the graphite worms were subjected to low-intensity sonication to produce separated (isolated) expanded graphite flakes. These expanded graphite flakes, after blended with Sn particles and metal salt in water solution, were then cast into layers of porous membrane.

The Sn-exfoliated graphite mixtures were gradually heated to 220° C. and allowed to stay at 220° C. for 1 hour and then cooled down to 200° C. and maintained at 200° C. for 30 minutes. The material system was then naturally cooled to room temperature after switching off the power to the oven.

Example 11: Removal of Graphene from the Ge Nanowire/Graphene Hybrid Materials

A certain amount of the Ge nanowire/graphene hybrid materials was put into a muffle furnace and calcined at 600° C.–800° C. for 2 hours under an air purging condition to remove the carbon content from the hybrid material, yielding Ge nanowire powders.

Example 12: Lithium-Ion Batteries Featuring Ge and Sn Nanowires as an Anode Active Material For electrochemical testing, several types of anodes and cathodes were prepared. For instance, a layer-type of anode was prepared by simply coating slurry of Ge or Sn nanowires, conductive additives, and a binder resin to form an anode layer against a sheet of Cu foil (as an anode current collector).

For instance, the working electrodes were prepared by mixing 75 wt. % active material (Ge or Sn nanowires), 17 wt. % acetylene black (Super-P, as a conductive additive), and 8 wt. % polyvinylidene fluoride (PVDF) as a binder dissolved in N-methyl-2-pyrrolidinoe (NMP). After coating the slurries on Cu foil, the electrodes were dried at 120° C. in vacuum for 2 h to remove the solvent before a compression treatment. When graphene sheets or expanded graphite flakes were included, the amount of acetylene black was reduced accordingly.

Then, the electrodes were cut into a disk (ϕ)=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M LiPF$_6$ electrolyte solution dissolved in a mixture of ethylene carbonate (EC) and diethyl carbonate (DEC) (EC-DEC, 1:1 v/v). Various anode material compositions were evaluated. The cell assembly was performed in an argon-filled glove-box. The CV measurements were carried out using a CH-6 electrochemical workstation at a scanning rate of 1 mV/s. The electrochemical performance of Si nanowires was also evaluated by galvanostatic charge/discharge cycling at a current density of 50-1,000 mA/g, using a LAND electrochemical workstation. Full-cell pouch configurations using lithium iron phosphate and lithium cobalt oxide cathodes were also prepared and tested.

It may be noted that the lithium-ion battery industry has adopted a nomenclature system for a charge or discharge rate. For instance, 1 C charging means completing charging procedure in 1 hour and 2 C charging means completing charging procedure in ½ hours (30 minute). A 10 C charging rate means charging completion in 1/10 hours (6 minutes).

Figure 9:
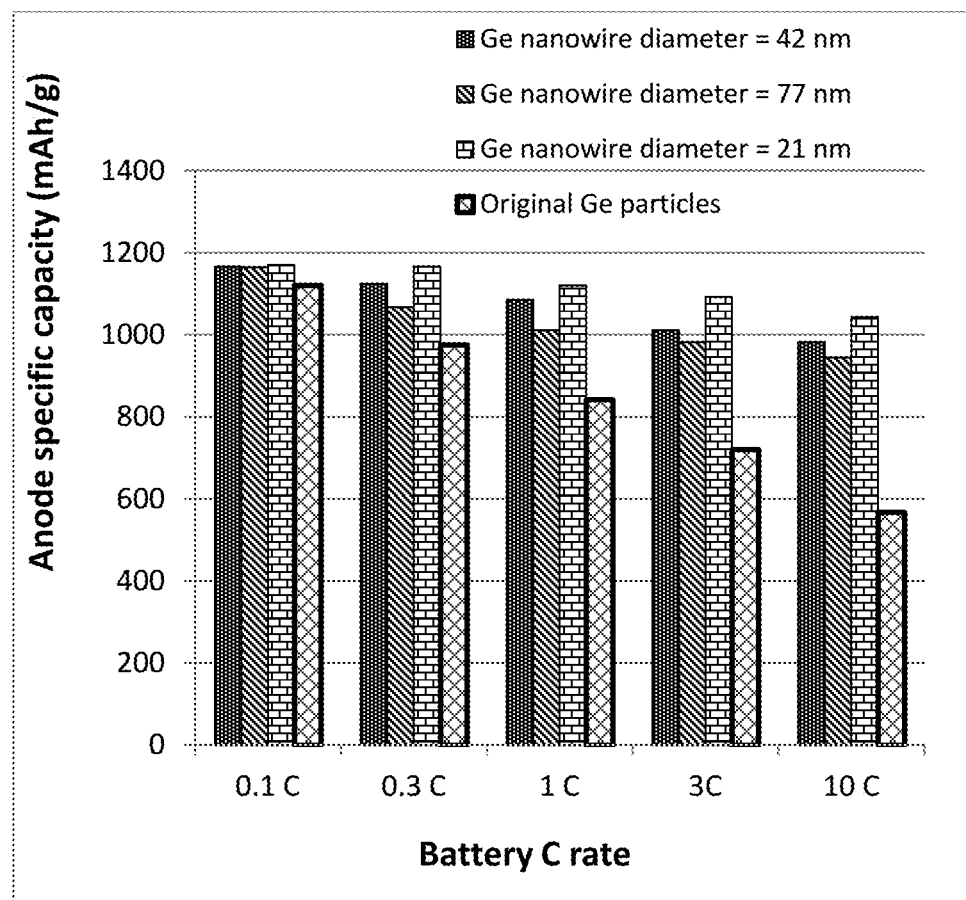

Some experimental results are summarized in FIG. 9, which indicates that the composite anode containing 75% by wt. of Ge nanowires having a diameter of 21 nm is capable of delivering a lithium storage capacity of 1,170 mAh/g (based on the total electrode composite weight, not just the Ge weight) at 0.1 C rate and 1,043 mAh/g at 10 C rate. These small-diameter Ge nanowires were obtained with the assistance of graphene sheets. The composite anode containing 75% by wt. of Ge nanowires having a diameter of 42 nm is capable of delivering a lithium storage capacity of 1,166 mAh/g at 0.1 C rate and 982 mAh/g at 10 C rate. At this ultra-high rate of 10 C, one can complete the charge or discharge in 1/10 hours or 6 minutes. In contrast, the lithium battery cell featuring original Ge particles as the anode active material exhibits a specific capacity of 1,120 mAh/g at 0.1 C rate, but the specific capacity drops to 567 mAh/g at a 10 C charge rate. This is a tremendous accomplishment. Imagine you can totally recharge your smart phone in 6 minutes. As of now, it typically takes 2 hours. As a point of reference, natural graphite, the most commonly used anode active material, is capable of storing lithium up to 370 mAh/g at 0.1 C rate, but only 250 mAh/g at 10 C rate.

Similar tends were observed for lithium-ion batteries that contain other types of semiconductor nanowires herein produced as the primary anode active material. These observations have demonstrated that smaller-diameter nanowires are significantly more high-rate capable in a lithium-ion battery. The present invention provides a cost-effective process for producing a wide variety of semiconductor nanowires.

Figure 10:
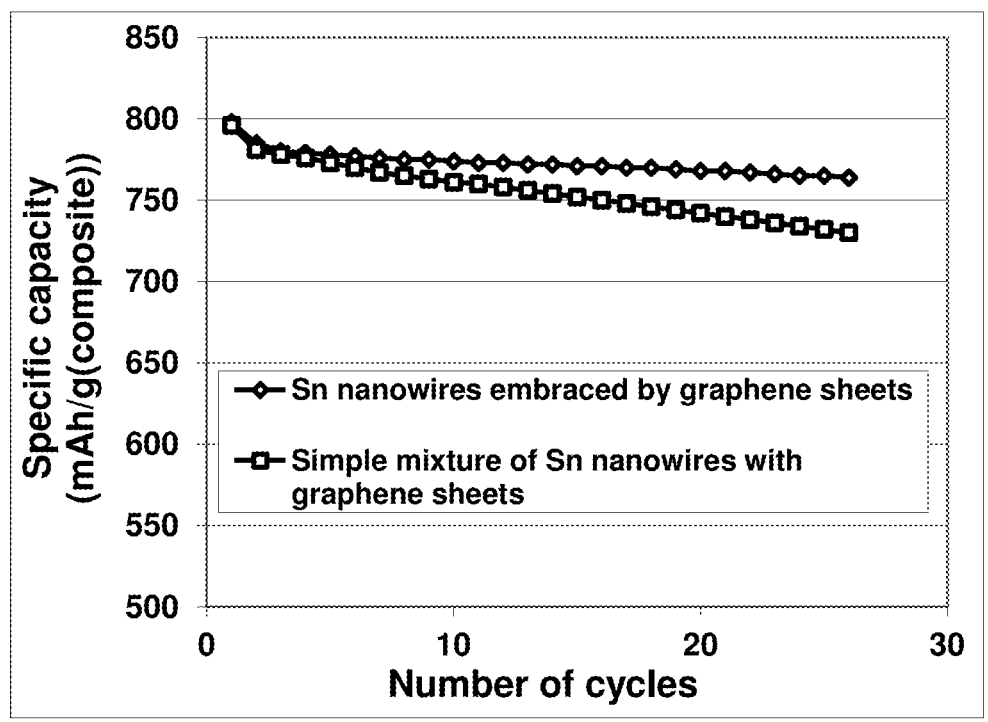
FIG. 10 The charge/discharge cycling behaviors of two lithium-ion cells, one featuring Sn nanowires grown in situ inside graphene sheet-encapsulated particulates as the anode active material and the other containing a simple mixture of Sn nanowires and graphene sheets.

FIG. 10 shows the charge/discharge cycling behaviors of two lithium-ion cells, one featuring Sn nanowires grown in situ inside graphene sheet-encapsulated particulates as the anode active material and the other containing a simple mixture of Sn nanowires and graphene sheets. The latter anode was obtained by preparing Ge nanowires without the presence of graphene sheets but later added with an equal amount of graphene sheets as a conductive additive. The results have demonstrated the superior cycling behavior of a lithium-ion battery having nanowires grown in situ inside graphene-encapsulated particulates. These nanowires are significantly longer and smaller in diameter. Many of these semiconductor nanowires are curly in shape having a radius of curvature that can be varied from 100 nm to 10 μm.

I claim:

1. A process for producing graphene/semiconductor nanowire hybrid material composition, said process comprising:
   (A) preparing a catalyst metal-coated mixture mass, which includes mixing exfoliated graphite flakes, having a flake thickness from 100 nm to 1 μm, or graphene sheets, having a thickness from 0.34 nm to 100 nm, with semiconductor particles, having a particle diameter from 50 nm to 50 μm, to form a mixture and depositing a catalytic metal, in the form of nanoparticles having a size from 1 nm to 100 nm or a coating having a thickness from 1 nm to 100 nm, onto surfaces of said exfoliated graphite flakes or graphene sheets and/or surfaces of said semiconductor particles, wherein said semiconductor material is selected from Ga, In, Sn, Pb, P, As, Sb, Bi, Te, a combination thereof, a compound thereof excluding GaAs, or a combination thereof with Si having less than 30% by weight of Si; and
   (B) exposing said catalyst metal-coated mixture mass to a high temperature environment, from 100° C. to 2,500° C., for a period of time sufficient to enable a catalytic metal-assisted growth of multiple semiconductor nanowires, having a diameter or thickness from 2 nm to 100 nm, from said semiconductor particles to form said graphene/semiconductor nanowire hybrid material composition.

2. The process of claim 1, wherein said graphene sheets are selected from pristine graphene, graphene oxide, reduced graphene oxide, graphene fluoride, graphene bromide, graphene iodide, boron-doped graphene, nitrogen-doped graphene, chemically functionalized graphene, or a combination thereof.

3. The process of claim 1, wherein said graphene sheets are selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

4. The process of claim 1, wherein said graphene sheets or exfoliated graphite flakes and said semiconductor particles are mixed to form a mixture in a particulate form of multiple secondary particles having a size from 1 μm to 30 μm.

5. The process of claim 4, wherein at least one of said secondary particles comprises multiple semiconductor nanowires that are embraced or encapsulated by a shell of graphene sheets or exfoliated graphite flakes.

6. A process for producing graphene/semiconductor nanowire hybrid material composition, said process comprising:
   (A) preparing a catalyst metal-coated mixture mass, which includes mixing exfoliated graphite flakes, having a flake thickness from 100 nm to 1 μm, or graphene sheets, having a thickness from 0.34 nm to 100 nm, with semiconductor particles, having a particle diameter from 50 nm to 50 μm, to form a mixture and depositing a catalytic metal, in the form of nanoparticles having a size from 1 nm to 100 nm or a coating having a thickness from 1 nm to 100 nm, onto surfaces of said exfoliated graphite flakes or graphene sheets and/or surfaces of said semiconductor particles, wherein said semiconductor material is selected from Ga, In, Sn, Pb, P, As, Sb, Bi, Te, a combination thereof, or a compound thereof, wherein said catalytic metal is selected from Pb, Bi, Sb, Zn, Cd, Ga, In, Zr, Te, P, Sn, or a combination thereof, wherein said catalytic metal is different than said semiconductor material; and
   (B) exposing said catalyst metal-coated mixture mass to a high temperature environment, from 100° C. to 2,500° C., for a period of time sufficient to enable a catalytic metal-assisted growth of multiple semiconductor nanowires, having a diameter or thickness from 2 nm to 100 nm, from said semiconductor particles to form said graphene/semiconductor nanowire hybrid material composition.

7. The process of claim 1, wherein said graphene sheets or exfoliated graphite flakes and said micron or sub-micron scaled semiconductor particles are mixed to form a mixture and semiconductor particles are wrapped around by graphene sheets or exfoliated graphite flakes.

8. The process of claim 1, wherein said graphene sheets or exfoliated graphite flakes and said micron or sub-micron scaled semiconductor particles are mixed to form a mixture and an optional conductive additive is added to this mixture to increase the conductivity of the mixture, wherein the conductive additive is selected from natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

9. The process of claim 1, wherein said step of depositing a catalytic metal includes (a) dissolving or dispersing a catalytic metal precursor in a liquid to form a precursor solution, (b) bringing said precursor solution in contact with surfaces of said graphene sheets or exfoliated graphite flakes and/or surfaces of said semiconductor particles, (c) removing said liquid; and (d) chemically or thermally converting said catalytic metal precursor to said catalytic metal coating or nanoparticles.

10. The process of claim 9, wherein said step (d) of chemically or thermally converting said catalytic metal precursor is conducted concurrently with the procedure (B) of exposing said catalyst metal-coated mixture mass to a high temperature environment.

11. The process of claim 9, wherein said catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, or a combination thereof.

12. The process of claim 9, wherein said catalytic metal precursor is selected from a nitrate, acetate, sulfate, phosphate, hydroxide, or carboxylate of a transition metal.

13. The process of claim 9, wherein said catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

14. The process of claim 1, wherein said step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof.

15. The process of claim 1, wherein said procedure of exposing said catalyst metal-coated semiconductor material to a high temperature environment is conducted in a protective atmosphere of an inert gas, nitrogen gas, hydrogen gas, a mixture thereof, or in a vacuum.

16. A process for producing graphene/semiconductor nanowire hybrid material composition, said process comprising:
(A) preparing a catalyst metal-coated mixture mass, which includes mixing exfoliated graphite flakes, having a flake thickness from 100 nm to 1 μm, or graphene sheets, having a thickness from 0.34 nm to 100 nm, with semiconductor particles, having a particle diameter from 50 nm to 50 μm, to form a mixture and depositing a catalytic metal, in the form of nanoparticles having a size from 1 nm to 100 nm or a coating having a thickness from 1 nm to 100 nm, onto surfaces of said exfoliated graphite flakes or graphene sheets and/or surfaces of said semiconductor particles, wherein said semiconductor material is selected from Ga, In, Ge, Sn, Pb, P, As, Sb, Bi, Te, a combination thereof, a compound thereof, or a combination thereof with Si having less than 30% by weight of Si; and
(B) exposing said catalyst metal-coated mixture mass to a high temperature environment, from 100° C. to 2,500° C., for a period of time sufficient to enable a catalytic metal-assisted growth of multiple semiconductor nanowires, having a diameter or thickness from 2 nm to 100 nm, from said semiconductor particles to form said graphene/semiconductor nanowire hybrid material composition, wherein said semiconductor material and said catalytic metal form an eutectic point and said procedure of exposing said catalyst metal-coated semiconductor material to a high temperature environment includes exposing said material to a temperature equal to or higher than said eutectic point for a desired period of time and then bringing said material to a temperature below said eutectic point.

17. The process of claim 16, wherein said exposure temperature is higher than said eutectic temperature by 0.5 to 500 degrees in Celsius scale.

18. The process of claim 1, wherein said step of mixing the semiconductor particles and graphene sheets is conducted by liquid solution mixing, homogenizer mixing, high shearing mixing, wet milling, air milling, or ball-milling.

19. The process of claim 1, wherein said mixing of graphene sheets with micron or sub-micron scaled semiconductor particles is conducted after surfaces of said graphene sheets and/or said semiconductor particles are deposited with said catalytic metal.

20. The process of claim 1, wherein said mixing of graphene sheets with micron or sub-micron scaled semiconductor particles is conducted in such a manner that the resulting mixture is in a form of porous secondary particles having a diameter from 1 μm to 20 μm and having mesopores therein from 2 nm to 100 nm in size.

21. The process of claim 1, further comprising a procedure of separating said graphene sheets from said semiconductor nanowires.

22. The process of claim 1, further comprising a procedure of removing said catalytic metal from said graphene-semiconductor nanowire hybrid material composition.

23. The process of claim 1, further comprising a procedure of mixing said graphene/semiconductor nanowire hybrid composition with a carbonaceous or graphitic material as a conductive additive and an optional binder material to form an electrode layer, wherein said carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

* * * * *